Nov. 25, 1958 W. HEIMANN 2,861,903
METHOD OF FORMING PHOTORESISTIVE COATINGS AND COMPOSITION
Filed Nov. 3, 1953
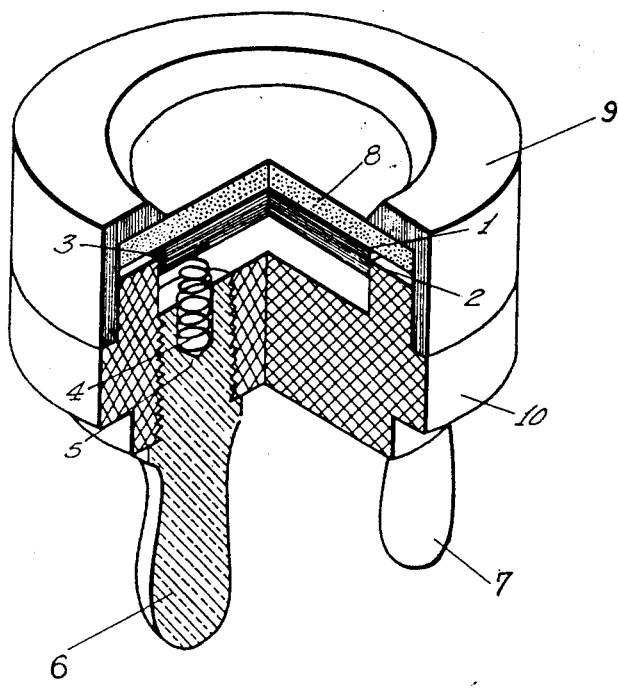
INVENTOR
Walter Heimann
By Ralph B. Stuart
attorney United States Patent Office 2,861,903
Patented Nov. 25, 1958

2,861,903
METHOD OF FORMING PHOTORESISTIVE COATINGS AND COMPOSITION

Walter Heimann, Wiesbaden, Germany, assignor to Societe Nouvelle de L'Outillage R. B. V. et de la Radio-Industrie (R. B. V.-R. I.), Paris, France, a joint-stock company Application November 3, 1953, Serial No. 390,045

Claims priority, application Germany November 10, 1952

9 Claims. (Cl. 117—200)

The present invention is related with photoelectric layers of the photoresistive type. It is well known that semi-conductors such as cadmium sulfide show internal photosensitivity when they are activated with heavy metal such as copper, silver, gold, mercury, nickel, etc., their photosensitivity in the visible spectrum is greater than the sensitivity of any other known material working under identical conditions. Nevertheless, the photosensitivity of a cadmium sulfide layer is very small in the red part of the visible spectrum and practically null in the near infra-red part of the spectrum.

It is usual practice to obtain crystals of cadmium sulfide by reaction in the vapor phase between cadmium vapors and hydrogen sulfide with an excess of hydrogen. The crystals obtained by this method are not very homogeneous due to the variations of concentration of the different reagents at different points.

A known remedy for this lack of homogeneity is to proceed to a reheating of the crystals. During this process, it is very difficult to control with precision the ratios of activators and as is well known photoelectric properties are very sensitive to slight differences in ratios. On the other hand, this process makes it very difficult to introduce in the base material any additive activator other than an excess of cadmium which is of no use as far as infra-red sensitivity is considered.

It has been proposed to make infra-red sensitive cells with cadmium selenide or telluride. The sensitivity of these cells is rather high in the near infra-red but very poor in the visible part of the spectrum.

The main object of the invention is to obtain photoresistive layer very sensitive, both in the visible spectrum, the near ultra-violet, and the near infra-red.

It is known that the cadmium sulfide cells activated with copper show rather quick decrease of sensitivity with time. This decrease of sensitivity is already noticeable when the cells are vacuum-tight and kept in vacuum, but the rate of decrease is much larger when the cells are in contact with the surrounding atmosphere and humidity. This loss of sensitivity is probably due to two different causes: first a flow of the copper atoms through the crystalline array, which phenomenon appears also in the activated lead sulfide layer and, secondly, an oxydation of the copper which is accelerated by the presence of water or water vapor.

It is a second object of the invention to make a wide frequency photosensitive cell, the sensibility of which is constant with time.

It is also known to use as an infra-red sensitive material lead sulfide, but the sensitivity is very poor.

It is a third object of the invention to provide an infra-red sensitive photoresistive material, the sensibility of which is $10^4$ times larger than the lead sulfide sensitivity and which supplies an output power of a few milliwatts without the use of any amplifier.

According to the invention, the photoresistive material is made of a base material plus an additive, said base material being cadmium sulfide and said additive being one of the following materials, or a mixture of two of them: selenium, tellurium, cadmium selenide and cadmium telluride.

The relative weight of additive is 5 to 30% of the weight of CdS. The photoelectric properties of said material are obtained by means of any of the heavy metal activator introduced in the microcrystalline layer by the thermal diffusion process.

The invention will be best understood by reference to the following description of one way of manufacturing an infra-red sensitive photoresistive layer and a cell incorporating said layer. To obtain 20 photoresistive layers of about 1 cm.$^2$ in surface the following operations are made.

Commercially available pure cadmium sulfide is vacuum evaporated on 20 inert plates of 1 cm.$^2$ in surface. These plates are made of glass and cleaned before the evaporation takes place. The thickness of the sulfide coating is of a few microns. The coated plates are then removed from the vacuum tight oven and embedded in 100 grammes of a mixture of powders of microcrystalline highly purified cadmium sulfide to which has been added 10 grammes of pure selenium. The mixture of powders comprises pure cadmium sulfide powder and highly activated cadmium sulfide. The activator concentration in the activated part of the powder is calculated so that the final concentration in the whole of the powder is equal to the activator concentration which is to be obtained in the photoresistive layer. When the particular activator used is copper sulfide and the concentration which is to be obtained in the layer is $10^{-3}$ in weight, the powder is made of 90 grammes of pure cadmium sulfide powder and 10 grammes of pure selenium and 10 grammes of cadmium sulfide containing 0.1 gramme of copper sulfide. When two different activators are used, the mixtures of powders are made of three different powders plus the additive, one powder being pure cadmium sulfide, and the two others of highly activated cadmium sulfide comprising each one a concentration of a particular activator such that the final concentration in the mixture is equal to the concentration which is to be obtained in the photoresistive layer. The preparation of small quantities of highly activated powders is usually more easy than the preparation of a large quantity of powder with a very small concentration of activators.

The powders are mixed together and put in a closed and air-tight crucible made of material which will not react with sulfur or cadmium or any of the activators. An alumina crucible is satisfactory. The coated plates are buried in the mass of the powder mixture and the crucible is put in an oven where it is heated in air at a temperature between 500 and 600° C. The volume of the oven is such that the correct amount of oxygen is in contact with the powders.

The photoresistive properties of the coating are checked from time to time and the heating is continued until the desired sensitivity in the desired range of wavelength is obtained. The coated plates are then removed from the powders in which they are embedded.

During heating a thermal diffusion between solids takes place which tends to equalize the different impurity concentrations in the whole of the powder and in the layers. On the other hand, thermal diffusion provides a better uniformity of the base material constituting the photoresistive coating itself.

When the concentration of an activator is sufficiently high, it is not necessary to overconcentrate part of the powder and therefore the crucible is filled with only one type of cadmium sulfide plus the additive (Se, Te, Cd Te or Cd Se or a mixture).

In the example of manufacture which has been described oxygen is used as one of the activators and it is supplied by the air in which the crucible is heated. When another activator is used, the heating should be performed in an inert atmosphere such as a rare gas or nitrogen.

When the concentration of the additive to the cadmium sulfide is varied the photoresistive properties of the layer are modified. As a summary it can be said that the infrared sensitivity and the time constant increase when the concentration in additive is increased. On the contrary, when copper is used as one of the activators, the sensitivity and the time-constant decrease when the concentration of copper is increased above a certain value.

On the figure is illustrated a complete photoresistive cell the sensitive layer of which is obtained as has been described. The photosensitive layer is shown at 1 coating a glass plate 2. One of the electrodes in contact with the layer is shown at 3. It consists of a conductive path painted with a metallic paint on the upper-surface of the layer and which is continued along the side and underneath plate 2 so as to make an electric contact with spring 4 which rests in a housing 5 of the external pin 6. There are two such electrodes on the sensitive layer the second of which is in contact with external pin 7. The operating voltage is applied between the two pins 6 and 7.

An envelope surrounds the active part of the cell. It comprises an upper window 8 which is transparent in the wavelength range corresponding to the sensitivity of the layer. The window is fixed in the upper part of the envelope. The lower part 10 of the envelope is sealed to the upper part. Both are made of plastic and colored, for instance by painting, so that no light falls on the layer apart from the light transmitted through the window. In the lower part of the envelope are provided two threaded holes in which are secured the threaded ends of the external pins 6 and 7. The electric contact between the pins and the springs is provided by elasticity.

A particular cell made according to the example described above showed the following characteristics:

Under an illumination of 0.3 mw./cm.$^2$, in the wavelength range comprised between 0.9 and 1.3 microns, the illuminated to dark ratio of resistances is 1 to $10^4$.

Under the same conditions the ratio of the resistances for a lead sulfide cell is 1 to 1.5.

On the other hand, photocells according to the invention show no decrease in sensitivity with time as is usually encountered with copper activated cadmium sulfide cells, on the contrary, the sensitivity shows a slight increase during the first month of storage. This characteristic holds both for vacuum tight cells and for cells in which the photosensitive material is in contact with the atmosphere.

It is usual to apply a working potential to this type of cell up to 100 v. without any noticeable deterioration of the photoresistive coating with time. Owing to the high infra-red sensitivity it is possible to obtain from such cells as described above, an output power of a few milliwatts without any amplification. This is a great technical advantage since it leads to very simple and inexpensive apparatus. As is well known the infra-red cells made until now require the use of a low level D. C. amplifier which is always delicate to design.

What I claim is:

1. A photoresistive material sensitive to near infra-red, visible and near ultra-violet light consisting essentially of cadmium sulfide as a basic component, at least one additive material selected from the group consisting of selenium, tellurium, cadmium selenide and cadmium telluride, and at least one metallic activator selected from the group consisting of copper, silver, gold, mercury, and nickel, the concentration of said additives being between 5 and 30% in weight with respect to the basic component, and the concentration of the activator material is of the order of $10^{-3}$ in weight.

2. A photoresistive material according to claim 1 wherein said additive materials are selenium and tellurium, and said metallic activator is introduced in said material by thermal diffusion between solids.

3. A photoresistive material according to claim 1 wherein said additive materials are cadmium selenide and cadmium telluride, and said metallic activator is introduced in said material by thermal diffusion between solids.

4. A photoresistive material according to claim 1, wherein said additive materials are selenium and tellurium, and said metallic activator material consists of two metals selected from the class specified.

5. A photoresistive material according to claim 1, wherein said additive materials are cadmium selenide and cadmium telluride, and said metallic activator material consists of two metals selected from the group specified.

6. The method of forming photoresistive material sensitive to near infra-red, visible and near ultra-violet light, which consists in forming upon the surface of a dielectric plate a film of cadmium sulfide by vacuum evaporation, said film being of a thickness of a few microns, placing said film in contact with a mixture of microcrystalline powders consisting of 90 parts of pure cadmium sulfide powder, 10 parts of pure selenium, and 10 parts of cadmium sulfide containing 0.1 part of copper sulfide, and heating said film and said powders to a temperature between 500 and 600° C.

7. A method according to claim 6 wherein said heating step is carried out in the presence of oxygen.

8. The method of forming photoresistive material sensitive to near infra-red, visible and near ultra-violet light, which consists in forming upon the surface of a dielectric plate a film of cadmium sulfide by vacuum evaporation, said film being of a thickness of a few microns, placing said film in contact with a mixture of microcrystalline powders consisting of 90 parts of pure cadmium sulfide powder, 10 parts of a material selected from the group consisting of selenium, tellurium, cadmium selenide and cadmium telluride, and 10 parts of cadmium sulfide containing 0.1 part of at least one metallic activator selected from the group consisting of copper, silver, gold, mercury, and nickel, and heating said film and said powders to a temperature between 500 and 600° C.

9. A method according to claim 8 wherein said heating step is carried out in the presence of oxygen.

References Cited in the file of this patent
UNITED STATES PATENTS 2,651,700    Gans  ---------------- Sept. 8, 1953
2,710,813    Forgue  --------------- June 14, 1955